US006610237B2

(12) United States Patent
Azima et al.

(10) Patent No.: US 6,610,237 B2
(45) Date of Patent: Aug. 26, 2003

(54) METHOD OF MAKING A LOUDSPEAKER DRIVE UNIT HAVING A RESILIENTLY SUSPENDED PANEL-FORM MEMBER

(75) Inventors: Henry Azima, Cambridge (GB); Graham Bank, Cambridgeshire (GB); Kieron Dunk, Cambridgeshire (GB); Julian Fordham, Cambridgeshire (GB); Neil Simon Owen, Cambridgeshire (GB)

(73) Assignee: New Transducers Limited, London (GB)

( * ) Notice: Subject to any disclaimer, the term of this patent is extended or adjusted under 35 U.S.C. 154(b) by 35 days.

(21) Appl. No.: 09/770,685

(22) Filed: Jan. 29, 2001

(65) Prior Publication Data

US 2001/0019616 A1 Sep. 6, 2001

Related U.S. Application Data

(63) Continuation of application No. PCT/GB99/02268, filed on Jul. 29, 1999.

(30) Foreign Application Priority Data

Jul. 29, 1998 (GB) ............................................ 9816395
May 14, 1999 (GB) ............................................ 9911156

(51) Int. Cl.[7] ................................................ B29C 67/20

(52) U.S. Cl. ....................... 264/259; 156/196; 156/221; 264/321

(58) Field of Search ................................ 264/46.4, 259, 264/321, 135; 156/196, 221

(56) References Cited

U.S. PATENT DOCUMENTS

| | | | | | |
|---|---|---|---|---|---|
| 3,961,378 | A | | 6/1976 | White | 29/594 |
| 5,099,949 | A | * | 3/1992 | Mitobe | 181/171 |
| 5,115,474 | A | | 5/1992 | Tsuchiya et al. | 381/158 |
| 5,319,718 | A | * | 6/1994 | Yocum | 381/193 |
| 5,650,105 | A | * | 7/1997 | Yocum | 264/45.5 |
| 5,705,108 | A | * | 1/1998 | Nonogaki | 264/46.4 |
| 5,793,002 | A | * | 8/1998 | Sato et al. | 181/169 |
| 6,183,674 | B1 | * | 2/2001 | Nonogaki | 264/46.4 |

FOREIGN PATENT DOCUMENTS

| | | |
|---|---|---|
| EP | 0 552 040 | 7/1993 |
| GB | 2 056 817 | 3/1981 |
| WO | WO 93/23966 | 11/1993 |
| WO | WO 97/09842 | 3/1997 |

* cited by examiner

*Primary Examiner*—Allan R. Kuhns
(74) *Attorney, Agent, or Firm*—Foley & Lardner

(57) ABSTRACT

A method of making an acoustic device in the form of a loudspeaker drive unit having a resonant panel-form member adapted to provide an acoustic output when excited with bending wave energy, comprising forming a resilient suspension for the panel-form member by molding and simultaneously fixing the resilient suspension to the panel-form member.

5 Claims, 3 Drawing Sheets

Fig. 3
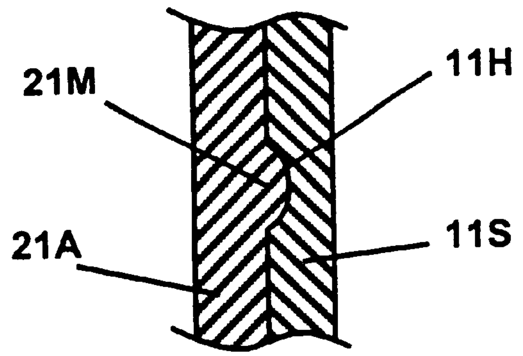
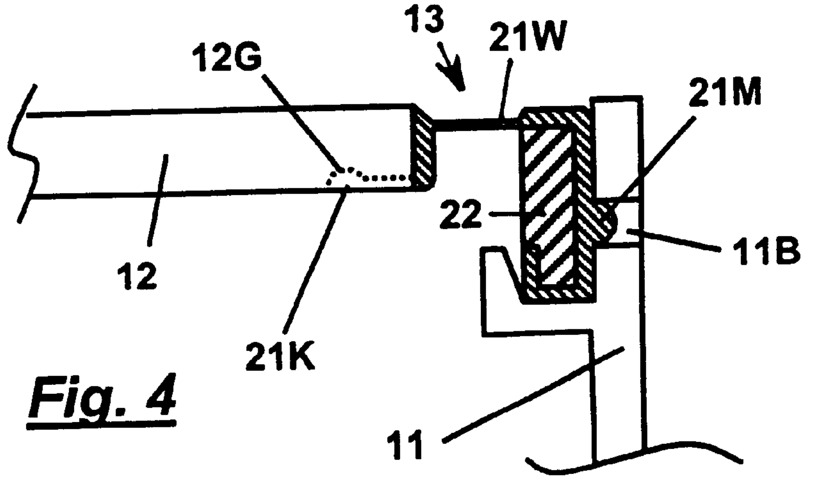
Fig. 4
Fig. 5
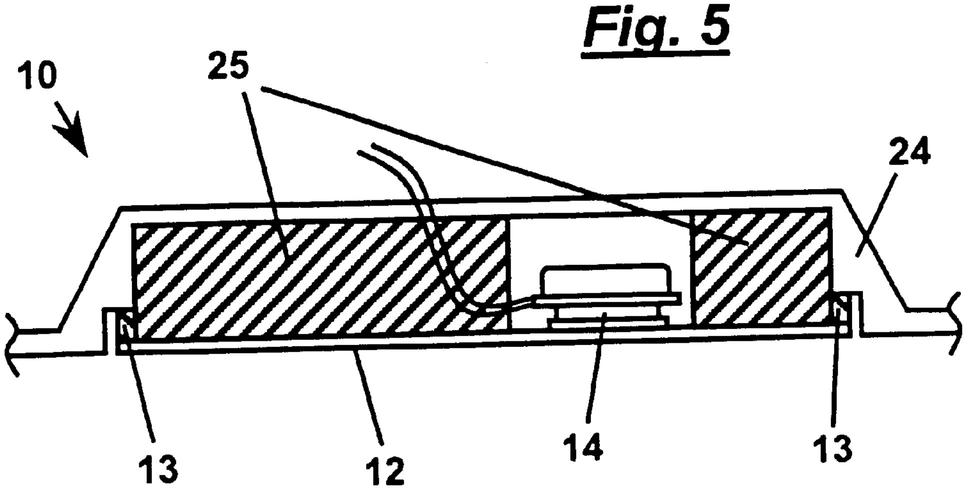

METHOD OF MAKING A LOUDSPEAKER DRIVE UNIT HAVING A RESILIENTLY SUSPENDED PANEL-FORM MEMBER

This application is a continuation of PCT/GB99/02268, filed Jul. 29, 1999.

TECHNICAL FIELD

This invention relates to a method of making acoustic devices of the nature of loudspeakers and loudspeaker drive units and comprising resonant panel-form members capable of producing an acoustic output when excited with bending waves, and to acoustic devices made by the method.

BACKGROUND ART

The basic patent teaching for such panel-form acoustic members, known as "distributed mode" or 'DM' devices, is in International patent application WO97/09842 of New Transducers Limited.

It is known to suspend such panel-form members on, for example, a frame or chassis by means of a resilient suspension fixed adhesively to the edge of the member. It is an object of the present invention to facilitate the mounting and suspension of resonant panel-form acoustic members relative to framing which may, for example, be a shallow enclosure or a so-called basket or chassis.

DM panel-form loudspeakers emit acoustic radiation from both sides of the panel, i.e. are bi-polar, and to facilitate positioning of the loudspeaker in a room, e.g. against a back wall, the rear radiation can be blocked or attenuated by placing the panel in a sealed box with a flexible surround or suspension round the panel perimeter to mount the panel in the box. This prevents any destructive interference from reflecting surfaces behind the panel. The panel surround or suspension may be a strip of flexible foam with adhesive tape on both sides.

However, in such an arrangement, standing waves may be set up in the rear enclosure which can adversely affect the frequency response of the panel. These standing waves can be damped by filling the enclosure with an acoustic absorber, e.g. of soft foam material, for example flexible polyester or polyether.

It is another object of the invention to provide a method of making an acoustic device comprising a resonant panel-form member in which a suspension for the panel and an acoustic absorber are combined.

SUMMARY OF THE INVENTION

From one aspect the invention provides a method of making an acoustic device in the form of a loudspeaker drive unit having a resonant panel-form member adapted to provide an acoustic output when excited with bending wave energy, comprising forming a resilient suspension for the panel-form member by moulding and simultaneously fixing the resilient suspension to the panel-form member.

The moulding may be with the aid of compression and/or heat and using a foamed plastics or rubber as the starting material for the suspension, or may comprise injection moulding of an elastomeric material.

Fixing of the suspension to the panel-form member may be accomplished with the aid of an adhesive or may involve direct injection of the suspension onto the panel-form member. The resilient suspension may be fixed to a peripheral margin of the panel-form member.

The method may comprise moulding a marginal portion of a block of soft or resilient foamed plastics or rubber by pressure and/or heat to form the suspension and such that a portion of the block of foamed plastics or rubber forms an acoustic absorber for attenuating or absorbing the acoustic output from one side of the panel-form member.

Where the suspension is injection moulded, a rigid support member may be co-moulded or integrally moulded or otherwise attached to the resilient suspension at a position spaced away from the edge of the panel-form member to provide a support for fixing the suspension in position, e.g. in an enclosure or in or on a frame or chassis. The rigid support may be in the form of a member extending round the periphery of the panel-form member as a continuous member or may be discontinuous where a suspension in the form of discrete suspension components or elements is required. A continuous suspension may provide an air or dust seal.

The fixing of the support to the enclosure or frame or chassis may be by clamping, adhesive, fasteners or the like or by a combination of these fixing methods.

Where the suspension is injection moulded it may abut the edge of the panel-form member or may surround or partially surround the edge of the panel-form member. The resilient suspension may also be such as to surround or at least partially surround the rigid support member. Locating elements in the form of protrusions or recesses or apertures may be moulded into the injection-moulded suspension or may be provided in the rigid support to locate the suspension in the frame, chassis or enclosure.

The suspension may be formed such that the suspension is an interference fit in or on the frame, chassis or the like and so that tension and/or compression is applied to the suspension when it is mounted to its frame, chassis or the like to enhance the contact therebetween.

From another aspect the invention is a loudspeaker drive unit made by the method described above.

From yet another aspect the invention is a loudspeaker comprising a drive unit as defined above. Preferably the panel-form member is constructed generally in accordance with the teachings in International patent application WO97/09842 and counterpart U.S. application Ser. No. 08/707,012, filed Sep. 3, 1996, and is thus a distributed mode device.

BRIEF DESCRIPTION OF THE DRAWINGS

Examples that embody the best mode for carrying out the invention are described in detail below and are diagrammatically illustrated in the accompanying drawings, in which:

FIG. 3 is a scrap sectional view showing a fitting location detail;

FIG. 4 is a scrap sectional detail view similar to that of FIG. 2A and showing a variant; and FIG. 5 is a cross-sectional side view of a second embodiment of loudspeaker drive unit.

DETAILED DESCRIPTION

Figure 1A:
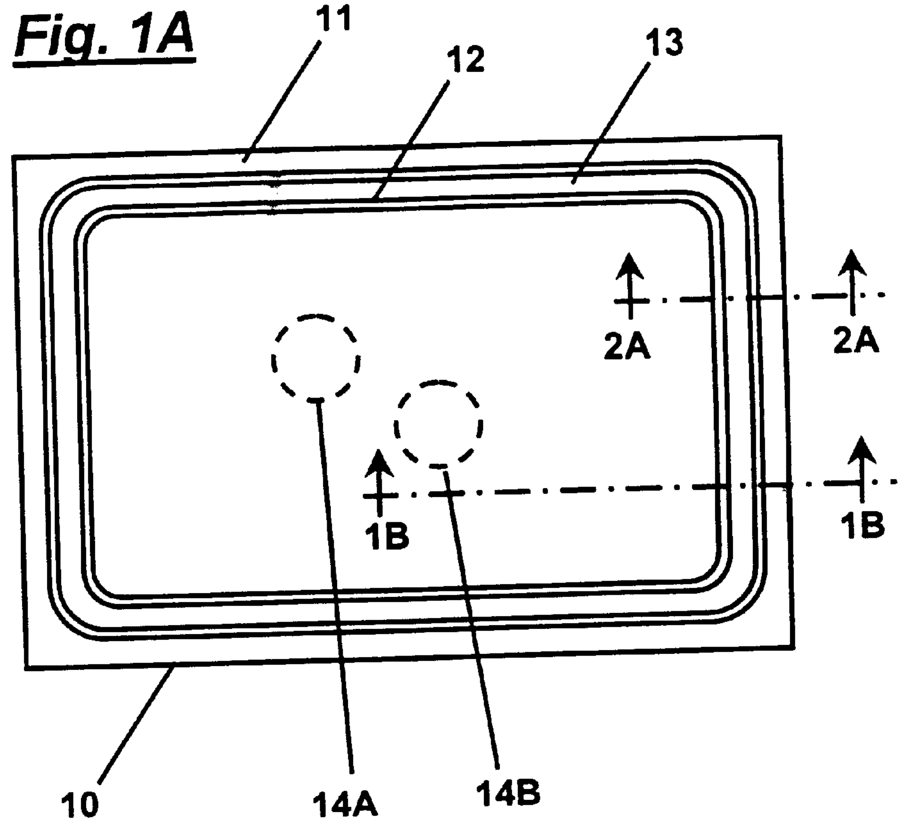
FIG. 1A is a plan view of a first embodiment of resonant panel-form loudspeaker drive unit according to the invention.
Figure 1B:
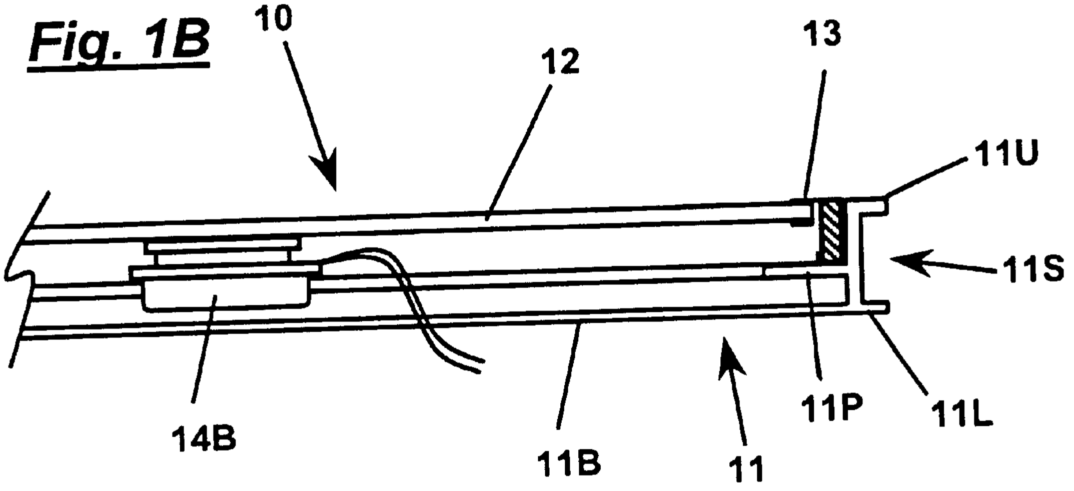
FIG. 1B is a sectional view of the drive unit of FIG. 1A taken along line 1B—1B.

In FIGS. 1A and 1B, a loudspeaker drive unit 10 comprises a shallow generally rectangular frame or basket 11 for a rectangular distributed mode acoustic panel 12 generally as taught in WO97/09842 and U.S. Ser. No. 08/707,012. The panel 12 is suspended in the frame 11 by way of a resilient suspension 13 extending round the edge of the panel 12. In this embodiment the frame 11 has a perforated base 1B, and sides 11S terminated by upper and lower outwardly extending flanges 11U, 11L. Internally the frame 11 is formed with an interior shelf 11P. The acoustic panel 12 has inertial vibration exciters 14A, 14B mounted thereon to impart bending wave energy into the panel.

Figure 2A:
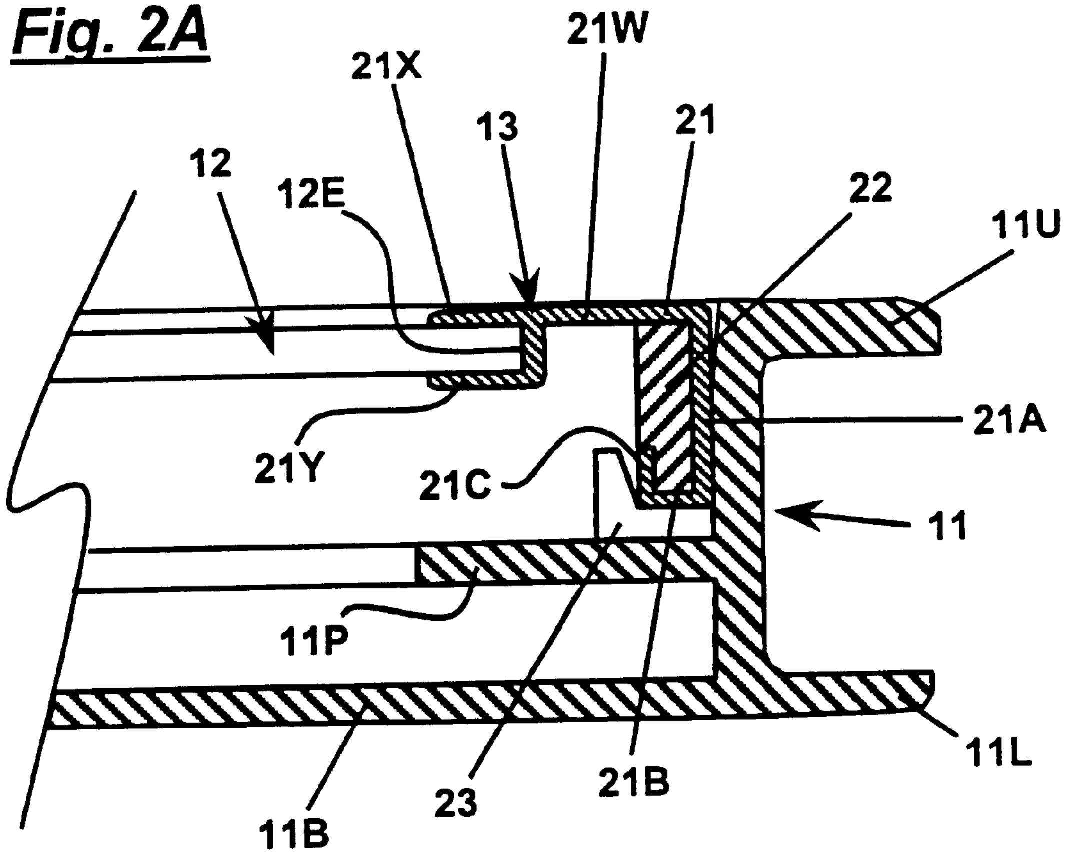
FIG. 2A is an enlarged sectional detail of the drive unit of FIG. 1B.
Figure 2B:
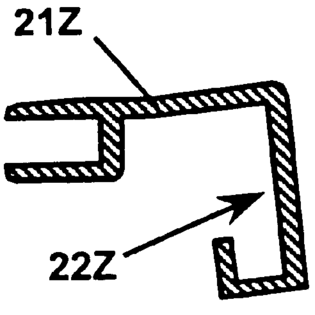
FIG. 2B is a scrap view of a detail in FIG. 2A.

Turning to FIGS. 2A and 2B, the resilient suspension 13 comprises relatively higher and lower compliance parts 21 and 22 which may be of an elastomer and of a rigid plastics, respectively. Lower compliance part 22 is in the form of a continuous ring-like rigid support member spaced from the edges of the panel 12. The higher compliance part 21 connects the rigid support member 22 and the panel edge 12E, and as shown is moulded to embrace both the member 22 at 21A and at 21B,C and the panel edge 12E at 21X and 21Y. The suspension part 21 has an intermediate web 21W contributing substantially to achieving the desired overall compliance of the panel suspension.

It is preferred and advantageous for the web 21W to have slight angling as moulded, as shown at 21Z in FIG. 2B, thus canting the suspension support 22, as shown at 22Z. Recovery of this angling 21Z, shown as more or less total but not necessarily so in FIG. 2A, when the suspension 13 is located in the frame 11 assists in achieving the desired intimacy of contact, if necessary with sealing, between the suspension and the frame with some element of compression of the part 21A. The suspension 13 may be located in the frame 11 on brackets 23 provided on the shelf 11P.

Deformability of the material of the part 21 of the suspension assists self-locating assembly in the frame and its resilience assists retention after assembly, though the additional use of an adhesive or clamping is possible.

The association of the parts 21 and 22 is conveniently achieved in a moulding operation which simultaneously incorporates the support 22 into the part 21 and which moulds the part 21 onto the panel edge 12E to form a strong bond therebetween.

As shown in FIG. 3, it can be useful to have mechanical latching between the suspension 13 and the frame, e.g. by forming projections 21M formed on the suspension part 21A and recesses 11H through the frame sides 11S. The projections 21M are shown as wholly in the part 21A, but could follow corresponding projections on the support 22. In practice it may be preferred to form the suspension 13 with indentations and to form corresponding projections on the frame 11.

Turning to FIG. 4, it is noted that thinning of the suspension web 21W is shown, typically to as little as 0.25 millimeter or less. Such thickness is, of course, readily adjustable by way of mould inserts. Desired air leakage may be afforded by slits (not shown) in the web 21W and/or by full height interruptions (not shown) of the part 21A, either or both also readily achieved by mould inserts as may be desired. FIG. 4 also has dashed indication of optional edge or near-edge rebating of the panel 12 to form groove 12G on its underside and into which the suspension 13 can be moulded at 21K.

FIG. 5 shows an embodiment of resonant panel-form loudspeaker drive unit 10 generally in accordance with the teaching in WO97/09842 and U.S. Ser. No. 08/707,012, and in which a resonant panel-form member 12, with an attached exciter 14, is mounted in a shallow enclosure 24 to contain acoustic radiation from the rear face of the panel, the arrangement being such that the panel suspension 13 and an acoustic absorber 25 in the enclosure 24 are integrated. Soft plastics foam used as the acoustic absorber 25 is compressed to the required thickness round the perimeter of the panel to form the flexible suspension 13 whereas the central region of the foam plastics filling the enclosure 24 remains uncompressed allowing it to form an effective acoustic absorber.

A manufacturing process for this unitary absorber/suspension is as follows:

1. Apply a layer of adhesive (e.g. epoxy, acrylic or cyanoacrylate) around the perimeter of the panel 12.
2. Cut a piece of uncompressed foam 25 to the required size.
3. Position the foam 25 in one half of the press tool and the panel 12 in the opposite half.
4. Close the press and apply heat and pressure suitable for the foam material to compress to form a suspension 13 at its margin and the adhesive to cure and form an effective bond between panel and suspension material.
5. Remove component from press tool.
6. The component comprising the panel, acoustic absorber and suspension can then for example be adhesively bonded or mechanically clamped to the back box or enclosure 24 to form a complete unit.

The embodiment of FIG. 5 thus provides an arrangement whereby the foam surround and acoustic absorber are incorporated into a single item which can be easily formed and bonded to the panel in a simple press tool. This new design simplifies the manufacturing process for a DML panel used in a closed back loudspeaker design.

What is claimed is:

1. A method of making an acoustic device in the form of a loudspeaker drive unit, the method comprising the steps of:

providing a resonant panel-form member adapted to provide an acoustic output when excited with bending wave energy, the panel-form member having opposed faces bounded by a peripheral edge;

providing a block of soft or resilient material, selected from the group consisting of foamed plastics and rubber, of sufficient size and shape to act as an acoustic absorber for attenuating or absorbing the acoustic output from one face of the panel-form member;

placing the block of material in contact with said one face of the panel-form member; and applying heat and pressure to the marginal portion of the block of material against the panel-form member so that the marginal portion becomes fixed to and forms a resilient suspension for the panel-form member, and the portion of the block of material bounded by the marginal portion forms an acoustic absorber.

2. A method according to claim 1, wherein an adhesive is applied between the panel-form member and the marginal portion of the block of material prior to the step of applying heat and pressure thereto.

3. A method according to claim 1 or claim 2, wherein the block of material extends to the peripheral edge of the panel-form member such that the resilient suspension formed is fixed to the peripheral margin of the panel-form member.

4. A method according to claim 3, further comprising attaching a rigid support member to the resilient suspension at a position spaced away from the peripheral edge of the panel-form member to provide a support for fixing the suspension in position.

5. A method according to claim 4, wherein the rigid support member is in the form of a substantially continuous member extending round the periphery of the panel-form member.

* * * * *